(12) United States Patent
Mandery et al.

(10) Patent No.: US 12,173,792 B2
(45) Date of Patent: *Dec. 24, 2024

(54) MODULAR PARK LOCK SYSTEM AND OPERATING METHOD

(71) Applicant: Dana Automotive Systems Group, LLC, Maumee, OH (US)

(72) Inventors: Nathan Mandery, Perrysburg, OH (US); David Luce, Perrysburg, OH (US); Cody Ott, Ida, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,667

(22) Filed: Jan. 8, 2024

(65) Prior Publication Data

US 2024/0141992 A1 May 2, 2024

Related U.S. Application Data

(63) Continuation of application No. 17/933,377, filed on Sep. 19, 2022, now Pat. No. 11,913,547.

(60) Provisional application No. 63/263,932, filed on Nov. 11, 2021.

(51) Int. Cl.
  *F16H 63/34* (2006.01)
(52) U.S. Cl.
  CPC ..... *F16H 63/3491* (2013.01); *F16H 63/3425* (2013.01); *F16H 63/3475* (2013.01)

(58) Field of Classification Search
  CPC .. F16H 63/3475; F16H 63/3433; F16H 63/34; F16H 63/3425; F16H 63/3491
  See application file for complete search history.

(56) References Cited

U.S. PATENT DOCUMENTS

| | | | |
|---|---|---|---|
| 5,875,688 A | * | 3/1999 | Porter ............... B60T 7/045 74/540 |
| 6,273,232 B1 | | 8/2001 | Kimura et al. |
| 6,481,556 B1 | * | 11/2002 | Haupt ............... F16H 63/3491 192/219.5 |
| 8,459,433 B2 | | 6/2013 | Völz et al. |
| 8,770,057 B2 | | 7/2014 | Ruhl |
| 10,377,353 B2 | | 8/2019 | Spaulding et al. |
| 2008/0277237 A1 | | 11/2008 | Ruhringer et al. |
| 2014/0182408 A1 | | 7/2014 | Galden |
| 2017/0234427 A1 | | 8/2017 | Hofkirchner et al. |
| 2018/0050668 A1 | | 2/2018 | Spaulding et al. |
| 2020/0248806 A1 | | 8/2020 | Klein |
| 2021/0108721 A1 | | 4/2021 | Weinl et al. |
| 2021/0116026 A1 | | 4/2021 | Weinl et al. |
| 2021/0197771 A1 | | 7/2021 | Frister et al. |
| 2022/0205534 A1 | | 6/2022 | Morise |

* cited by examiner

*Primary Examiner* — Lori Wu
(74) *Attorney, Agent, or Firm* — McCoy Russell LLP

(57) ABSTRACT

A park lock unit and method for operation of said unit are provided. In one example, the park lock unit includes a sliding assembly that engages and disengages a parking pawl from a toothed wheel and an electronic actuation assembly configured to engage the parking pawl with the toothed wheel when electric power provided to the electronic actuation assembly drops below a threshold value. The park lock unit further includes a manual release mechanism configured to disengage the parking pawl from the toothed wheel in response to operator input.

20 Claims, 5 Drawing Sheets

| | Mode 1 | Mode 2 | Mode 3 | Mode 4 |
|---|---|---|---|---|
| Condition | Drive | Park | Tow | Power loss |
| Manual Release Mechanism (254) | | | X | |
| Solenoid (214) | X | | | |
| Actuator Shaft Assembly (248) | | X | | X |

MODULAR PARK LOCK SYSTEM AND OPERATING METHOD

CROSS REFERENCE TO RELATED APPLICATIONS

The present application is a continuation of U.S. Non-Provisional patent application Ser. No. 17/933,377, entitled "MODULAR PARK LOCK SYSTEM AND OPERATING METHOD", and filed on Sep. 19, 2022. U.S. Non-Provisional patent application Ser. No. 17/933,377 claims priority to U.S. Provisional Application No. 63/263,932, entitled "MODULAR PARK LOCK SYSTEM AND OPERATING METHOD", and filed on Nov. 11, 2021. The entire contents of the above-listed applications are hereby incorporated by reference for all purposes.

TECHNICAL FIELD

The present disclosure relates to a park lock system and method for operation of said system. More particularly the present disclosure relates to a park lock system for an electric drive system.

BACKGROUND AND SUMMARY

Vehicles include park lock mechanisms to prevent vehicle movement when the vehicle is stationary by engaging a park lock gear in the transmission. In internal combustion engine (ICE) vehicles these systems typically include a shift lever that when placed into park actuates a parking pawl to lock the transmission's output shaft to the transmission casing. More recently shift-by-wire systems have been employed in vehicles which facilitate electronic communication between a gear selector and the park lock system, and more generally the vehicle transmission. Shift-by-wire systems may be particularly desirable in electric vehicles (EVs) due to packaging efficiency that can be achieved by the systems. However, EVs may have different park lock demands than full ICE vehicles. For instance, the inventors have recognized that engagement of the park lock system in the event of electric power loss in the vehicle may be wanted under some conditions to impede vehicle movement. However, under other conditions it may be desirable to disengage the park lock when the vehicle has lost power. For instance, in a towing scenario, unlocking the park lock may be wanted. However, previous park lock systems that automatically engage park lock, under certain conditions, have been incapable of manual park lock release after the automatic engagement. Further, certain prior park lock systems have exhibited interrelated component functionality, thereby constraining the system's adaptability with regard to component arrangements and functionality.

The inventors have recognized the abovementioned drawbacks of previous park lock systems and developed a park lock unit to overcome at least a portion of the drawbacks. In one example, the park lock unit includes sliding assembly configured to engage and disengage a parking pawl from a toothed wheel. The park lock unit further includes an electronic actuation assembly configured to engage the parking pawl with the toothed wheel, when electric power provided to the electronic actuation assembly drops below a threshold value. The park lock unit further includes a manual release mechanism configured to disengage the parking pawl from the toothed wheel in response to operator input. In this way, a modular park lock unit is provided that defaults into park lock engagement in the event of electric power loss while also allowing an operator to disengage park lock when desired (such as in anticipation of vehicle towing). Consequently, the system's capabilities are expanded, thereby increasing customer appeal. The unit's modular design also reduces the chance of cascading component degradation and therefore increases the unit's reliability and enables the unit's applicability to be expanded.

In one example, the electronic actuation assembly may include a solenoid that retracts and decouples a retaining pawl from the sliding assembly when de-energized. In this way, the unit may efficiently achieve the default to park lock engagement functionality when the solenoid loses power.

In another example, the manual release mechanism may include a cam that induces translation of the sliding assembly into a disengaged position, when actuated. In this way, the manual release mechanism may space efficiently axially translate the sliding assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A park lock system is described herein that automatically engages a park lock unit in the event of vehicle power loss and allows this park lock engagement to be manually disengaged by the vehicle operator. In this way, the chance of undesirable vehicle movement stemming from vehicle power loss is reduced by defaulting to park lock in the event of power loss while allowing the operator to manually release this park lock engagement, when vehicle movement is wanted for maneuvers such as towing, for instance. The automatic park lock engagement and manual release functions are achieved using a modular design that permits the unit's adaptability to be increased along with the unit's reliability due to the decreased chance of interrelated component degradation. Consequently, the system's customer appeal is increased.

Figure 1:
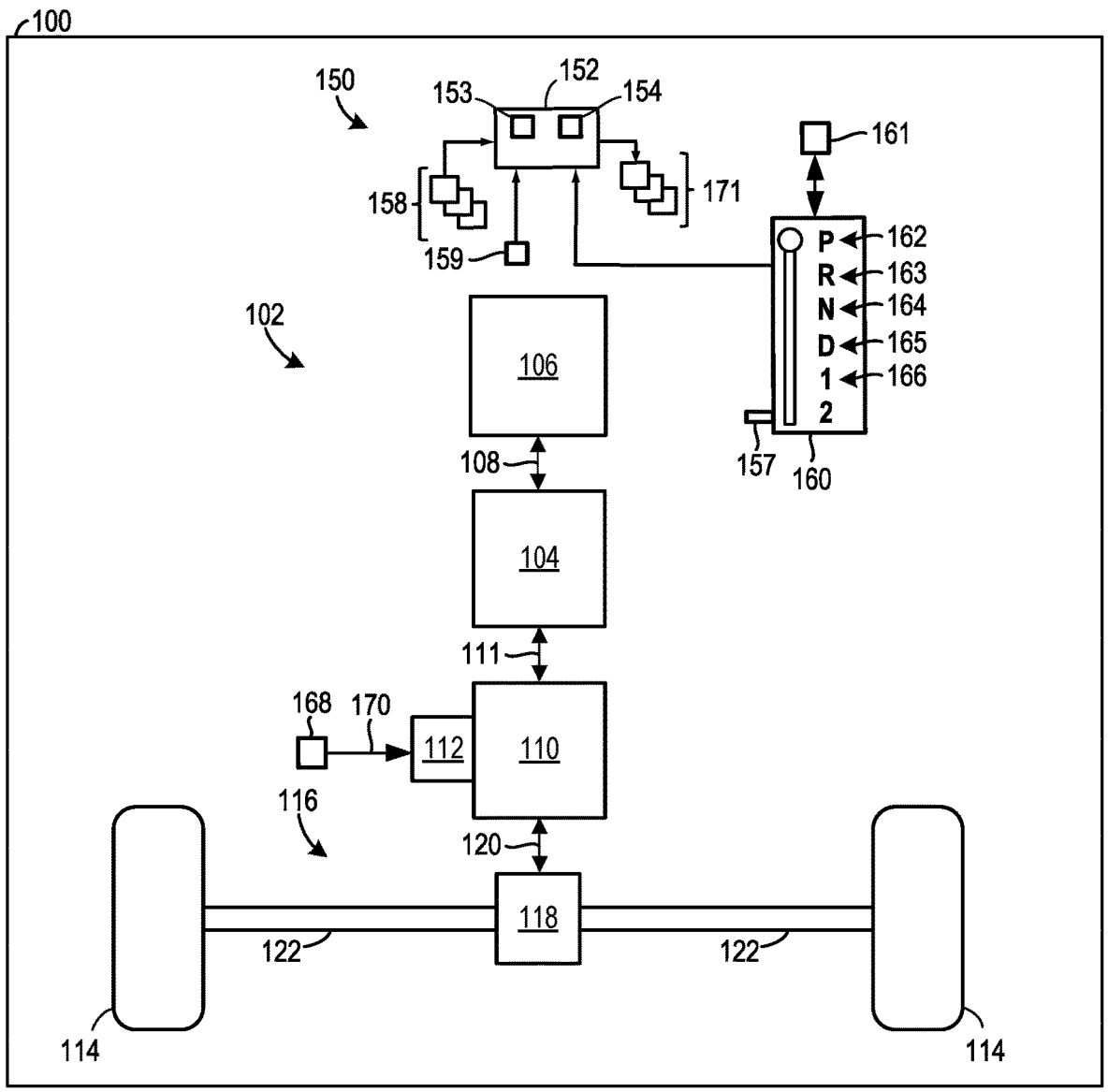
FIG. 1 shows a vehicle with an electric drive system with a transmission and a park lock unit.
Figure 1:
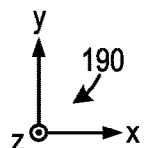
Figure 2:
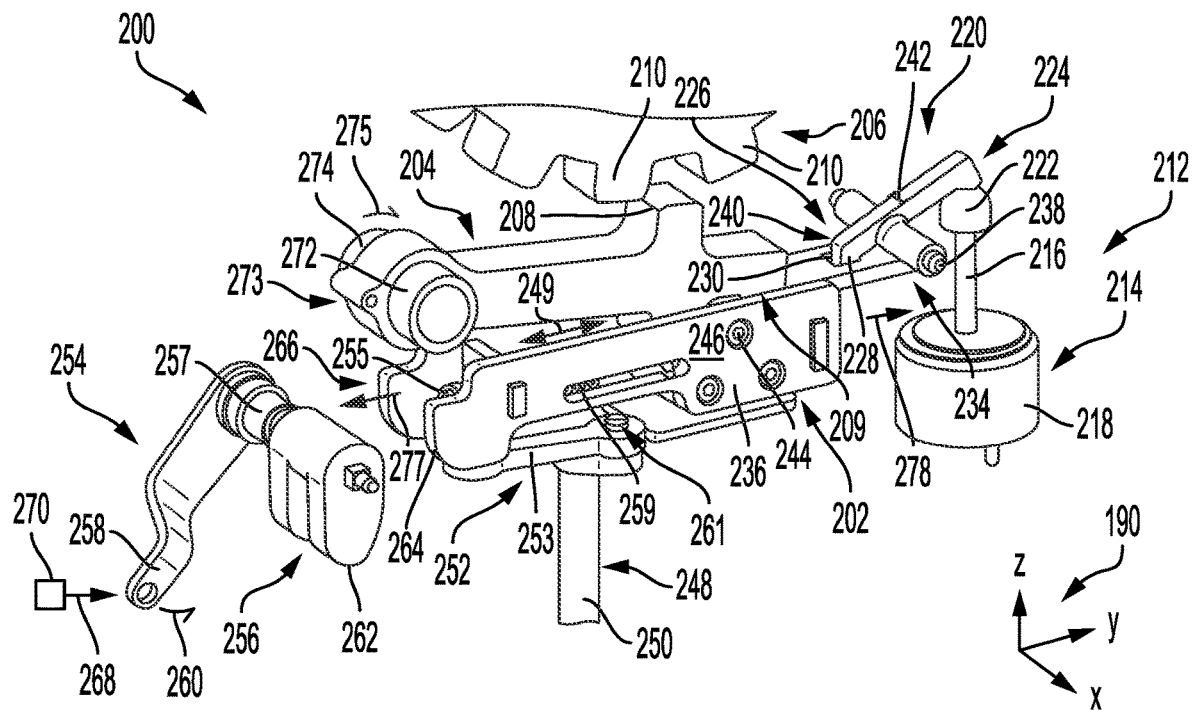
FIGS. 2 and 3 show an example of a park lock unit.
Figure 3:
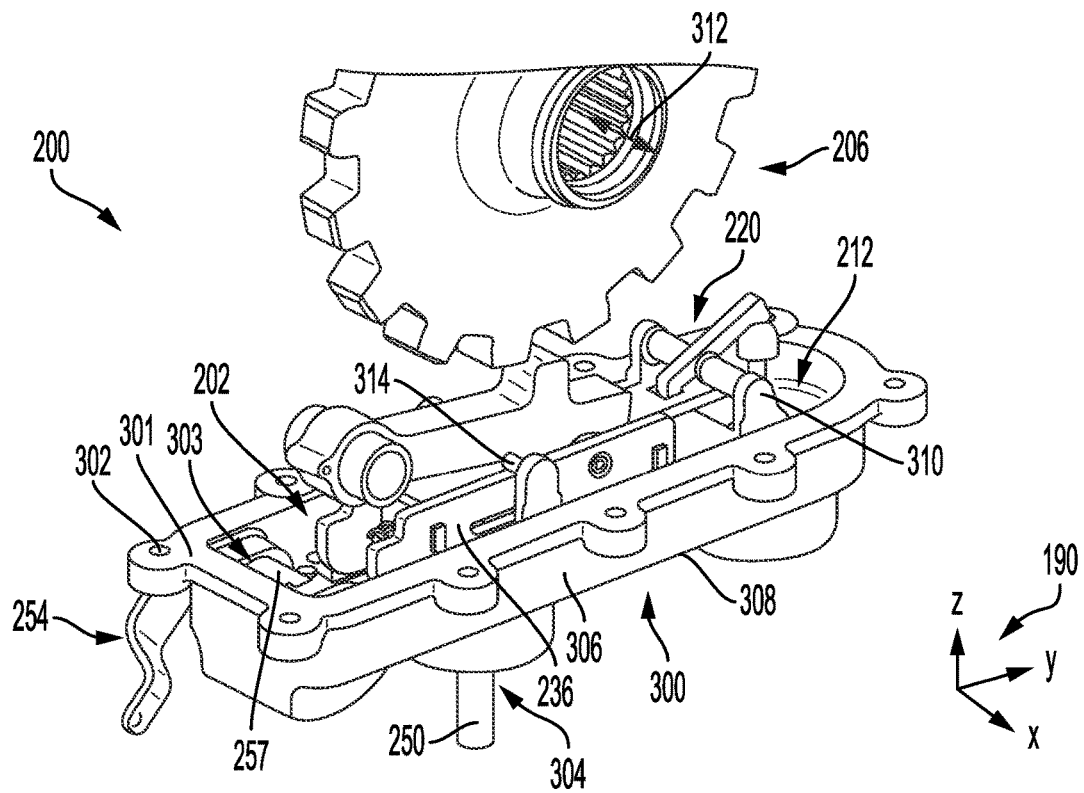
Figure 4A:
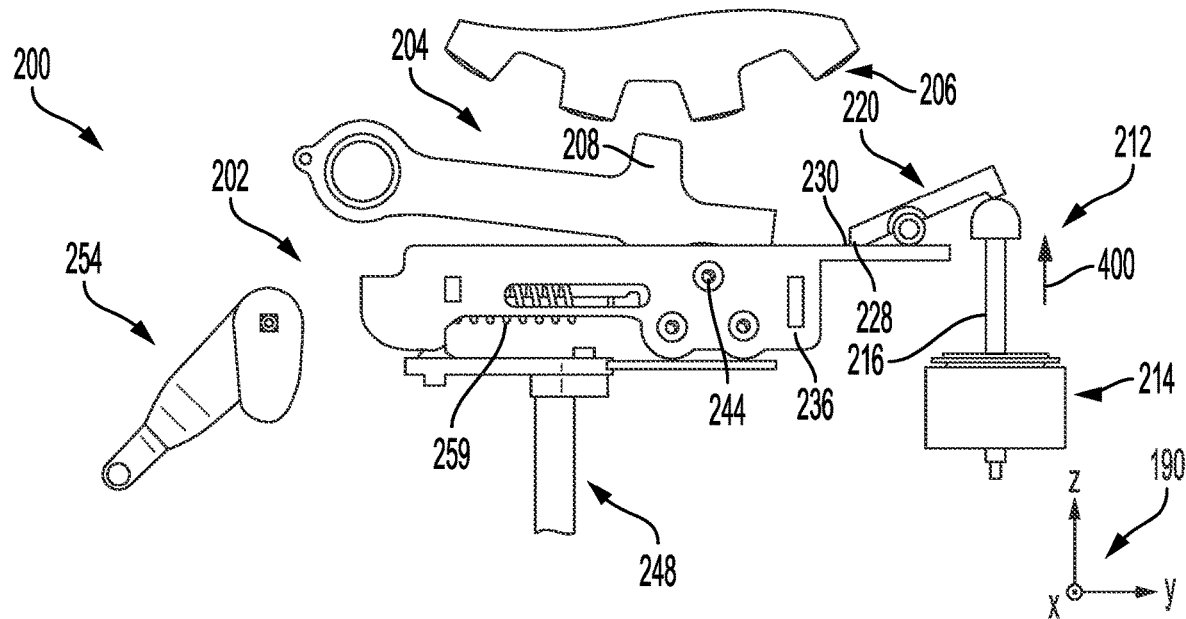
FIG. 4A-4D show the park lock unit, depicted in FIGS. 2 and 3, in different operating modes.

FIG. 1 shows a schematic depiction of a vehicle with an electric drive system that includes a park lock unit. FIGS. 2-3 show different views of an exemplary park lock unit which engages park lock during vehicle power loss as well as permits manual release of this park lock engagement. FIGS. 4A-4D show the park lock unit operating in an unlocked mode induced via shift device (e.g., gear selector) movement, a locked mode induced via shift device movement, an unlock mode induced via manual release, and a lock mode automatically induced in the event of power loss in the system. FIG. 4E shows a table correlating the engagement states of the different park lock components to the unit's different operating modes. FIG. 5 shows a method for operation of a park lock unit that permits a vehicle operator to manually release the park lock unit after the unit automatically transitions into park lock engagement responsive to system power loss.

FIG. 1 depicts a vehicle 100 with an electric drive system 102. As such, the vehicle 100 may be an electric vehicle (EV). In one example, the vehicle may be an all-electric vehicle due to its reduced complexity and therefore reduced points of potential component degradation when compared to vehicles with internal combustion engines. For instance, the electric drive unit may be an electric axle or include a traction motor that provide power to transmission which in turn provides power to a drive axle. However, in other example, the vehicle 100 may be a hybrid electric vehicle (HEV) where the vehicle includes an internal combustion engine (ICE) along with the electric drive unit. For instance, the electric drive unit may provide power to one axle while the ICE provides power to another axle or the ICE may be configured to recharge the traction battery or other suitable energy storage device for range extension. Further, the vehicle 100 may be a light, medium, or heavy duty vehicle.

The electric drive system 102 may include an electric machine 104 (e.g., an electric motor or motor-generator such as a multi-phase alternating current (AC) motor-generator, although numerous types of electric machines have been contemplated) and an energy storage device 106 (e.g., a battery such as a traction battery), capacitor, combinations thereof, and the like). Arrows 108 depict the transfer of electrical energy between the energy storage device 106 and the electric machine 104. The energy storage device 106 may additionally provide electrical energy to other vehicle components such as an electrical actuation assembly in a park lock unit 112, discussed in greater detail herein. When the electric machine 104 is an AC machine, the electric drive system 102 may include an inverter that converts direct current (DC) from the energy storage device 106 into AC for the electric machine and vice versa.

The electric drive system 102 may include a transmission 110 (e.g., a multi-speed gearbox) that is coupled to the electric machine 104. Specifically, arrows 111 denote the transfer of mechanical power between the electric machine 104 and the transmission 110. Said power transfer may be implemented via shafts, gears, chains, rotational couplings, combinations thereof, and the like. The transmission 110 may include gears, clutches, shafts, and the like to achieve the multi-speed functionality. The park lock unit 112 may be mechanically attached (e.g., bolted, clamped, combinations thereof, and the like) to the transmission 110. The park lock unit is configured to selectively inhibit rotation of the transmission, thereby inhibiting vehicle movement. As such, the park lock unit 112 may be included in the transmission 110. The park lock unit 112 is schematically illustrated in FIG. 1. However, the park lock unit 112 has greater structural and functional complexity that is expanded upon herein with regard to FIGS. 2-4D.

The transmission 110 may be coupled to one or more drive wheels 114 via an axle 116 that may include a differential 118, for example. However, a variety of axle configurations have been contemplated. Arrows 120 specifically denote the transfer of power between the transmission 110 and the axle 116 (e.g., the differential 118). Axle shafts 122 may be coupled to the drive wheels 114 and the differential 118. The electric drive system 102 may be an electric axle, in one embodiment. Electric axles can provide a highly adaptable and space efficient drive unit package. However, in other examples, the electric drive system 102 may include a transmission and electric motor that are spaced away from the axle assembly.

The vehicle 100 may further include a control system 150 with a controller 152 as shown in FIG. 1. The controller 152 may include a microcomputer with components such as a processor 154 (e.g., a microprocessor unit), input/output ports, an electronic storage medium 153 for executable programs and calibration values, e.g., a read-only memory chip, random access memory, keep alive memory, a data bus, and the like. The storage medium may be programmed with computer readable data representing instructions executable by a processor for performing the methods and control techniques described herein as well as other variants that are anticipated but not specifically listed.

The controller 152 may receive various signals from sensors 158 coupled to various regions of vehicle 100. For example, the sensors 158 may include an electric machine speed sensor, a pedal position sensor to detect a depression of an operator-actuated pedal, such as an accelerator pedal or a brake pedal, speed sensors at the wheels 114, a shift device position sensor 157, and the like. An input device 159 (e.g., accelerator pedal, brake pedal, combinations thereof, and the like) may further provide input signals indicative of an operator's intent for vehicle acceleration and braking.

A shift device 160 (e.g., gear selector) may further be included in the electric drive system 102. The shift device 160 may include a park position 162. The shift device 160 may further include a reverse position 163, a neutral position 164, a drive position 165, and/or one or more gear position 166 (e.g., a first gear position, a second gear position, etc.). Responsive to an operator (schematically depicted at 161) placing the shift device 160 into the park position 162 the park lock unit 112 may be placed in an engaged configuration. Conversely, responsive to the operator moving the shift device out of the park position into one of the other available positions, the park lock unit may be placed in a disengaged configuration. Thus, the park lock unit may be unlocked when the gear selector is shifted into drive, reverse, or neutral and locked when the gear selector is shifted into park. The shift device 160 and components in the transmission such as the park lock unit, clutches, and the like may be in electronic communication with the controller 152. Thus, in such an example, the park lock unit and clutches may be engaged and disengaged via electronic command signals from the controller 152. However, in other examples, at least a portion of the components in the transmission such as the park lock unit may be mechanically coupled to the shift device. Furthermore, in the shift-by-wire embodiment, the park lock unit may be configured for operator induced disengagement as well as electronic engagement and disengagement, as discussed in greater detail herein. To accomplish the manual park lock disengagement functionality, a manual park lock release device 168 (e.g., a lever, a knob, a foot pedal, and the like) may further be included in the electric drive system 102. Responsive to operator interaction with the manual park lock release device 168 the park lock unit 112 may be manually disengaged. Further, in some example, the manual park lock release device 168 may be configured to be manually reset by the operator, subsequent to actuation of the device. Additionally, the mechanical connection between the park lock unit 112 and the manual park lock release device 168 is depicted via arrow 170. This mechanical connection may be accomplished via a cable, mechanical linkage, combinations thereof, and the like.

Upon receiving the signals from the various sensors 158 of FIG. 1, the controller 152 processes the received signals, and employs various actuators 171 of vehicle components to adjust the components based on the received signals and instructions stored on the memory of controller 152. For example, the controller 152 may receive an accelerator pedal signal indicative of an operator request for increased vehicle acceleration. In response, the controller 152 may command operation of the electric machine 104 to adjust actuators in the electric machine to alter machine power output to increase the power delivered from the machine to the drive wheels via the transmission. Further, the controller may receive a signal from the shift device 160 indicative of movement of the device into the park positon. Responsive to receiving this signal, the controller may send a command to the park lock unit to place it in an engaged configuration that inhibits vehicle motion. The other controllable components in the vehicle may function in a similar manner with regard to sensor signals, control commands, and actuator adjustment, for example.

An axis system 190 is provided in FIG. 1, as well as FIGS. 2-4D, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 shows a park lock unit 200. The park lock unit 200 serves as an example of the park lock unit 112 depicted in FIG. 1. As such, the park lock unit 200 may be included in the electric drive system 102 and/or share common structural and/or functional features with the park lock unit 112 depicted in FIG. 1 or vice versa.

The park lock unit 200 includes a sliding assembly 202 configured to engage and disengage a parking pawl 204 from a toothed wheel 206. The toothed wheel 206 may be a sprocket or parking gear that is coupled to a rotational component in a transmission such as an output shaft. In the sprocket embodiment, a chain may be used to connect the sprocket to the rotational transmission component. In an engaged positon, a protrusion 208 (e.g., tooth) in the parking pawl 204 (which may be positioned on one longitudinal side 209 of the pawl) mates with a gap between teeth 210 in the toothed wheel 206. The toothed wheel 206 may be coupled to a shaft (e.g., an output shaft) in the transmission. As such, arresting rotational motion of the toothed wheel 206 via engagement between the parking pawl 204 and the toothed wheel 206, inhibits drivetrain and more generally vehicle movement. Disengagement between parking pawl and the toothed wheel 206, conversely, permits mechanical power to be transferred through the transmission to the drive wheels or vice versa. In other words, vehicle motion is not inhibited by the park lock unit 200 when it is disengaged.

An electronic actuation assembly 212 is further included in the park lock unit 200. The electronic actuation assembly 212 may include a solenoid 214. The solenoid 214 may be electrically energized via a controller command that induces energy transfer to the solenoid from an energy storage device. Responsive to energization and de-energization, a shaft 216 of the solenoid 214 may extend and retract away from and towards a body 218 of the solenoid 214. The solenoid 214 may be energized and de-energized during park lock disengagement and engagement. Park lock engagement and disengagement is described in greater detail herein with regard to FIGS. 4A-4D.

Further, in the event of power loss in the electric drive system and vehicle, more generally, the solenoid 214 may become de-energized. A power loss event in the electric drive system as described herein may be an event when the state of charge of a battery or other energy storage device, drops below a threshold value and inhibits the vehicle's electrical system from supplying the solenoid 214, the electric machine, and/or other system components with electric power for operation thereof. The threshold value may be a zero state of charge (SOC) value or a value approaching zero SOC. Alternatively, in certain examples, the threshold value may be greater than zero SOC (e.g., 0.5% SOC, 1% SOC, 2% SOC, 5% SOC, or 10% SOC) to reduce the likelihood of energy storage device degradation. The threshold value may be determined based on one or more factors such as the chemistry of the battery, battery temperature, electric drive system and/or vehicle power demands, and the like.

The solenoid shaft 216 may be in contact with a retaining pawl 220 that may be included in the electronic actuation assembly 212. Specifically, in one example, a distal end 222 of the shaft 216 may be in face sharing contact with a first end 224 of the retaining pawl 220. The distal end may be dome shaped, although other contours have been contemplated.

The retaining pawl 220 may include at a second end 226, an extension 228 (e.g., a hook). The extension 228 selectively mates with a recess 230 in the sliding assembly 202. The engagement between the extension and the recess depends on the rotational positon of the retaining pawl. Specifically, the recess 230 may be included on a first axial side 234 of the sliding assembly 202 (e.g., a carriage 236 of the sliding assembly). The retaining pawl 220 may be spring loaded, in one example. Further, the retaining pawl 220 may pivot about a shaft 238. To elaborate, the shaft 238 may be positioned between the first end 224 and a second end 240 of the retaining pawl 220 to achieve a space efficient arrangement. Specifically, in one example, the shaft 238 may be offset from a midline 242 of the retaining pawl 220, closer to the end 224, to permit the pawl to disengage from the recess due to gravitational forces, when the solenoid is de-energized. In other examples, the retaining pawl may be spring loaded to permit the retaining pawl to disengage from the recess when the solenoid is de-energized.

The carriage 236 of the sliding assembly 202 may further have a roller 244 positioned therein. Specifically, the roller 244 may extend between two sidewalls 246 of the carriage 236 and may be allowed to rotate with regard to the carriage.

The park lock unit 200 may further include an actuator shaft assembly 248. The actuator shaft assembly 248 may include a connection shaft 250 that in response to rotation of said shaft in one direction induces translation of the carriage 236 into an engaged position and rotation of said shaft in the opposite direction induces translation of the carriage into a disengaged position. This translation may take place along a longitudinal axis 249 of the carriage. The connection shaft 250 may be rotated via an electric motor, mechanical linkage, combinations thereof, and the like. The actuator shaft assembly 248 may include rotational linkage 252 that connects the shaft 250 to the carriage 236, although other assembly configurations have been contemplated. The rotational linkage 252 may specifically include a component 253 that is coupled to the connection shaft 250. The component 253 may rotate about pivots 261 at opposing sides of the component and may be coupled (e.g., pivotally coupled) to a shaft 255 that may be spring loaded via a spring 259. The shaft 255 is fixedly coupled to the carriage 236. Specifically, the shaft may be coupled to the carriage between the sidewalls 246 to increase the unit's compactness. However, alternate attachment techniques between the carriage 236 and the shaft 255 may be used, in other embodiments.

The park lock unit 200 further includes a manual release mechanism 254. The manual release mechanism 254 may include a cam 256 which may reside on a cam shaft 257 and is configured to axially translate the carriage 236 of the sliding assembly 202 into a disengaged position. The manual release mechanism 254 may further include a lever 258 that is configured to actuate the cam 256. To elaborate, rotation of the lever 258 in direction 260 causes rotation of the cam 256. This rotation of the cam 256, in turn, causes a lobe 262 of the cam to contact a curved surface 264 of the carriage 236 that may be at a longitudinal end 266 of the carriage. In this way, cam movement may cause translation of the carriage. A cable and/or mechanical linkage, depicted via arrow 268, may further be included in the manual release mechanism 254. An operator interface 270, such as a lever, pedal, or other suitable mechanism may be coupled to the cable and/or mechanical linkage to permit an operator to actuate the manual release mechanism.

The parking pawl 204 may pivot about a pawl shaft 272. The pawl shaft 272 may be positioned at longitudinal end 273 of the parking pawl 204. The pawl shaft may be coupled to a transmission housing, other transmission component, or the housing of the park lock unit, in various embodiments. A return spring 274 coupled to the parking pawl 204 may further be included in park lock unit 200. The return spring 274 may exert a force on the parking pawl 204 when the pawl is engaged with the toothed wheel 206. In this way, when the carriage 236 moves into a disengaged positon, the parking pawl 204 rotates in direction 275 to decouple the parking pawl from the toothed wheel 206.

Figure 4B:
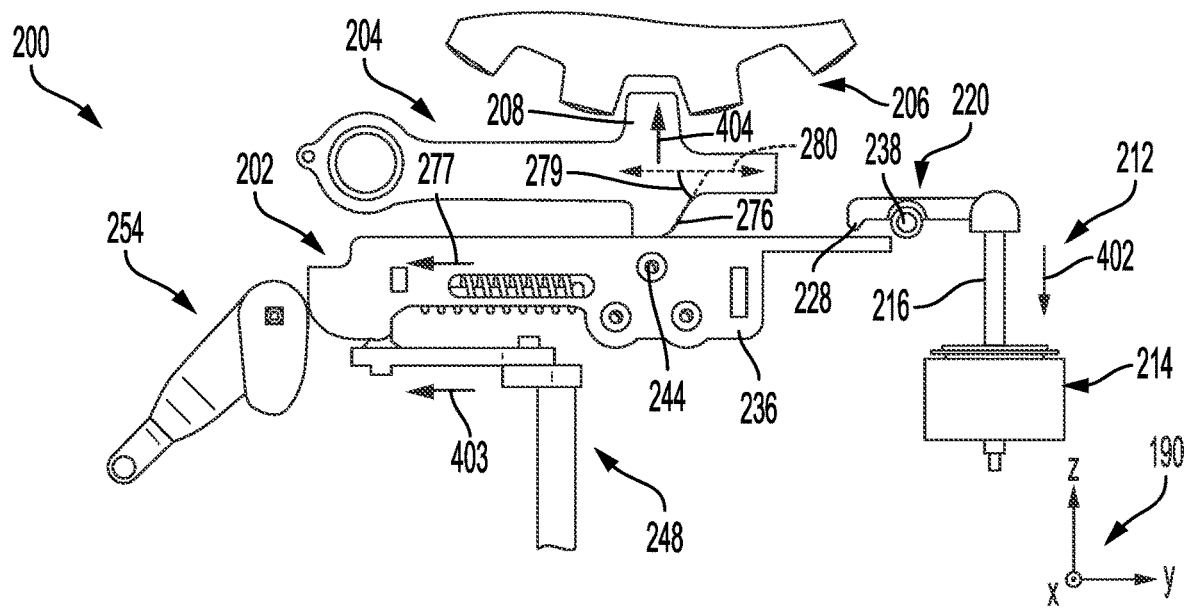

A ramp 276, shown in FIG. 4B, in the parking pawl 204 may be profiled to interact with the roller 244 to push the parking pawl 204 closer to the toothed wheel 206 in response to axial movement of the carriage in the direction 277, shown in FIG. 2. Referring again to FIG. 2, conversely, axial movement of the carriage 236 in the opposite direction 278 moves the parking pawl 204 further away from the toothed wheel 206. As such, the ramp 276, shown in FIG. 4B, may form an angle 279 with regard to a longitudinal axis 280 of the carriage 236.

Continuing with FIG. 2, the park lock unit 200 is modular such that the electronic actuation assembly 212 and the manual release mechanism 254 may have standalone functionality. That is to say, that the operation of each assembly may function independently with regard to one another. Thus, if the electronic actuation assembly 212 is omitted from the unit or degraded, the manual release mechanism 254 may function as intended. Conversely, if the manual release mechanism is omitted from the unit or degraded, the electronic actuation assembly may function as intended. In this way, the chance of cascading component degradation may be decreased. Consequently, the park lock unit's reliability and repairability is increased.

FIG. 3 shows the park lock unit 200 with the manual release mechanism 254, the sliding assembly 202, and the electronic actuation assembly 212 at least partially enclosed by a housing 300. The housing 300 is contoured to mechanically attach to a transmission such as the transmission 110, depicted in FIG. 1. To achieve the mechanical attachment functionality, the housing 300 may include a flange 301 with openings 302. Attachment devices (e.g., bolts) may extend through the openings 302 to permit the housing to be efficiently attached to the transmission. In this way, the housing 300 may be profiled to mechanically attach to the transmission. However, other housing profiles for attaching the housing to the transmission have been contemplated.

The housing 300 may further include an opening 303 to permit the cam shaft 257 to extend therethrough as well as an opening 304 to allow the connection shaft 250 to extend therethrough. The housing 300 may even further include sidewalls 306 and a lower wall 308. The housing 300 may additionally include retaining pawl mounts 310 that attach to the shaft 238 of the retaining pawl 220 and permit the pawl to pivot with regard to the housing responsive to solenoid energization and de-energization. A rotational axis 312 of the toothed wheel 206 is further illustrated in FIG. 3. Further, guide pins 314 for the carriage 236 may additionally be included in the housing.

FIGS. 4A-4D show the park lock unit 200 operating in different modes (i.e., modes 1-4). The sliding assembly 202, manual release mechanism 254, and electronic actuation assembly actuation assembly 212 are again shown and redundant description is omitted for brevity.

In the first mode, depicted in FIG. 4A, the park lock unit 200 is in an unlocked state during a drive condition (e.g., a forward or reverse drive condition). In this unlocked state, the solenoid 214 is energized and the shaft 216 is extended, as indicated via arrow 400, to push the retaining pawl 220 into engagement with the carriage 236 and hold the carriage in a disengaged position where the roller 244 is not interacting with the ramped surface 276, shown in FIG. 4B, of the parking pawl 204. When the roller 244 and ramped surface 276 of the parking pawl 204 are positioned in this manner, the protrusion 208 of the parking pawl is spaced away from the toothed wheel 206, enabling the wheel and therefore the transmission to rotate. It will be understood, that a controller (e.g., the controller 152, shown in FIG. 1) may command sustained energization of the solenoid 214. As previously discussed, engagement between the retaining pawl 220 and the carriage 236 may involve mating between the extension 228 in the retaining pawl and the recess 230 in the carriage such that movement of the carriage along an axis parallel to the y-axis is inhibited.

Further, in the first mode, the actuator shaft assembly 248 may be disengaged and the spring 259 in the actuator shaft assembly 248 may be compressed. Still further, in the first mode where the unit is unlocked, the manual release mechanism 254 has not been actuated and the cam 256 is therefore spaced away from the carriage 236.

In the second mode, depicted in FIG. 4B, the park lock unit 200 is in a locked state during a park condition. To place the unit in the park condition, the operator may move the gear selector or other suitable shift device into its park position. In the locked state, the solenoid 214 is de-energized such that the shaft 216 is moved into its retracted position, as indicated via arrow 402. It will be understood, that a controller (e.g., the controller 152, shown in FIG. 1) may command de-energization of the solenoid 214 to move the shaft into its retracted position. Upon retraction of the solenoid shaft, the retaining pawl 220 pivots about shaft 238 and disengages from the carriage 236. Further, in the second mode, the actuator shaft assembly 248 is engaged and moved in direction 403, thereby moving the carriage in direction 277. As the carriage is moved in direction 277, the roller 244 interacts with the ramped surface 276 of the parking pawl 204 to move (e.g., rotate) the pawl in direction 404 such that the protrusion 208 mates with the toothed wheel 206 to inhibit rotation thereof.

Figure 4C:
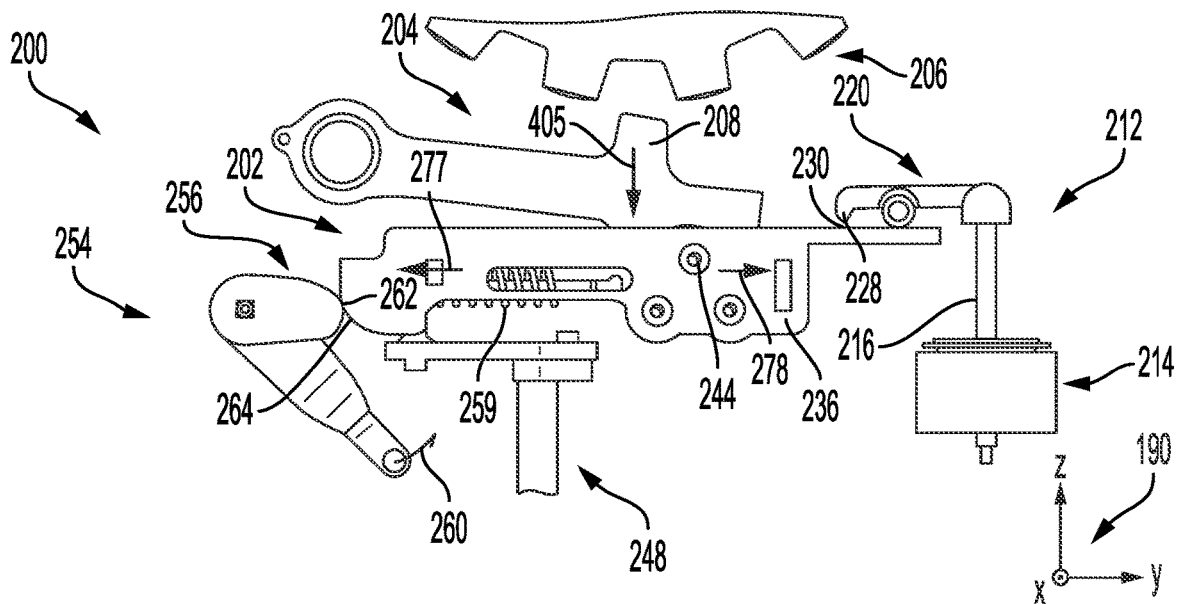

In the third mode, depicted in FIG. 4C, the park lock unit 200 is in an unlocked state induced via the manual release mechanism 254. As previously discussed, the operator may cause the unit to enter into this mode in anticipation of vehicle towing operation, for instance. However, it will be appreciated that the park lock unit may be placed in the third mode during other operating conditions.

In the third mode, the solenoid 214 is de-energized and the shaft 216 is in the retracted position. In this way, the carriage 236 is able to translate along an axis parallel to the y-axis. In the third mode, the lever 258 in the manual release mechanism 254 is rotated in the direction 260. As such, the retaining pawl 220 and specifically the extension 228 of the retaining pawl disengages the recess 230 in the carriage 236. The cam 256 correspondingly rotates in response to lever movement. After the cam 256 is rotated, the cam's lobe 262 in the manual release mechanism 254 is in contact with the curved surface 264 of the carriage 236 and pushes the carriage in the direction 278. Movement of the carriage 236 in the direction 278, moves the roller 244 away from the ramped surface 276, shown in FIG. 4D, such that the parking pawl 204 moves (e.g., rotates) in direction 405. Consequently, the protrusion 208 disengages from the toothed wheel 206. In this way, the toothed wheel 206, and the transmission more generally, are allowed to rotate in the third mode depicted in FIG. 4C. Further, the spring 259 may be compressed in the third mode, enabling the carriage 236 to move in direction 277 when the manual release mechanism 254 is reset to re-engage the parking pawl 204 and the toothed wheel 206 to place the unit back in the locked configuration. Further, in the third mode, the actuator shaft assembly 248 is in a disengaged engaged position.

Figure 4D:
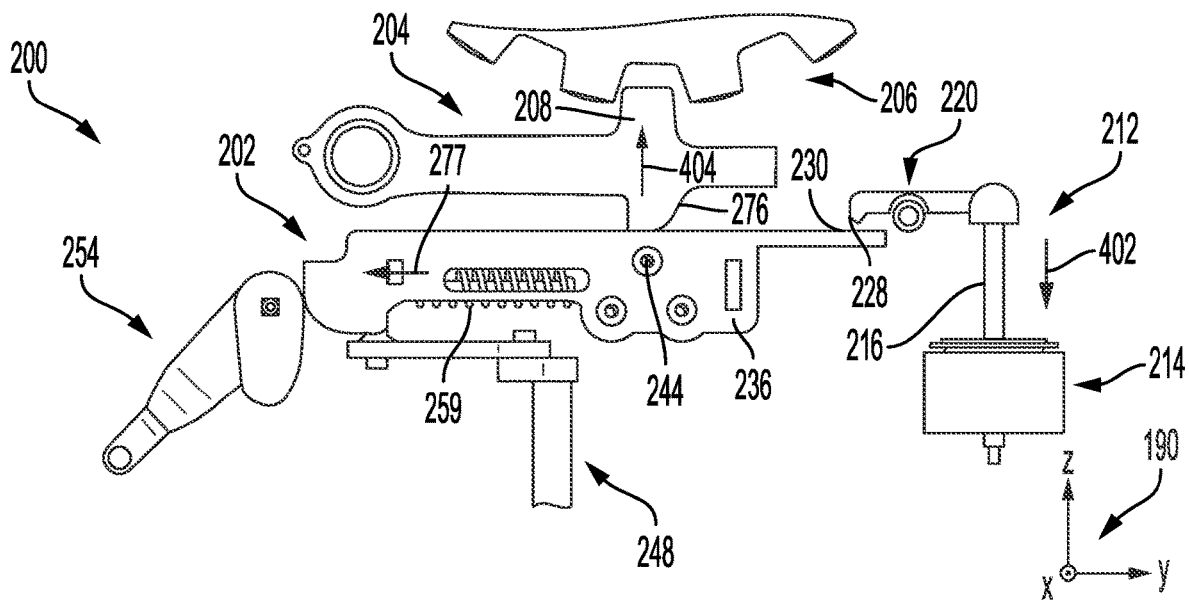
Figures 4E, 5:
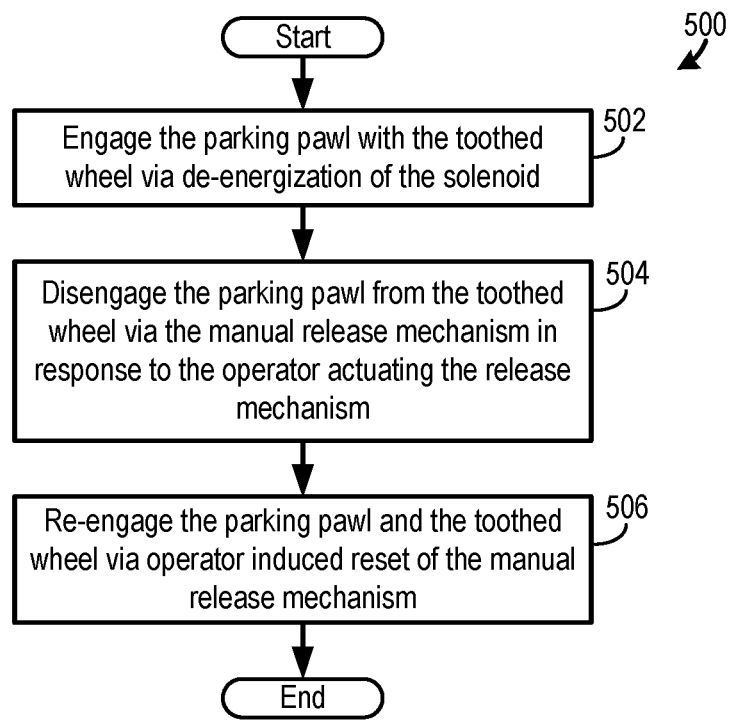
FIG. 4E shows a chart that correlates the configurations the different actuation components in the park lock unit and the modes of park lock unit operation, depicted in FIGS. 4A-4D.
FIG. 5 shows a method for operation of an electric driveline system.

In the fourth mode, depicted in FIG. 4D, the park lock unit 200 is in a locked state that is induced by a power loss event in the electric drive system. The solenoid 214 is de-energized when the system loses electrical power and the solenoid shaft 216 retracts in direction 402. Responsive to the retraction of the solenoid shaft, the retaining pawl 220 rotates such that the extension 228 in the pawl decouples from the recess 230 in the carriage 236. Responsive to decoupling of the retaining pawl 220 from the carriage 236, the carriage moves in direction 277 due to the decompression of the spring 259. In turn, movement of the carriage in this manner, pushes the parking pawl 204 in direction 404, due to the interaction between the roller 244 in the carriage 236 and the ramped surface 276 in the parking pawl 204. Movement of the parking pawl in this direction causes the protrusion 208 in the parking pawl 204 to mate with the toothed wheel 206 and inhibit rotation thereof. Further, in the fourth mode, the actuator shaft assembly 248 is in an engaged position. In this manner, the park lock unit is automatically placed in a locked state when the solenoid loses power.

FIG. 4E shows a chart 450 that correlates the configurations of various components in the park lock unit with the unit's operating modes. The chart 450 includes a condition row where the condition of the electric drive system is indicated. The conditions include a drive condition corresponding to the first mode, a park condition corresponding to the second mode, a tow condition corresponding to the third mode, and a power loss condition corresponding to the fourth mode. An "X" denotes engagement of the corresponding component and a blank field conversely indicates disengagement of the component. Engagement of the manual release mechanism 254 infers movement of the mechanism's cam to actuate the carriage in the sliding assembly and disengagement infers the opposite. Engagement of the solenoid 214 infers energization of the solenoid to place the solenoid shaft in an extended position and disengagement infers solenoid de-energization. Further, engagement of the actuator shaft assembly 248 infers the movement of the assembly into a position that urges the park lock unit into the locked configuration and disengagement infers the opposite.

In the first mode, the solenoid 214 is engaged and the manual release mechanism 254 and the actuator shaft assembly 248 are disengaged. In this way, the transmission is permitted to rotate during drive operation.

In the second mode, the actuator shaft assembly 248 is engaged while the solenoid 214 and the manual release mechanism 254 are disengaged. In this way, the transmission rotation is inhibited while the vehicle is in park.

In the third mode, the manual release mechanism 254 is engaged while the solenoid 214 and the actuator shaft assembly 248 are disengaged. In this way, the transmission can be permitted to rotate in anticipation of vehicle towing operation.

In the fourth mode, the actuator shaft assembly is engaged while the solenoid and the manual release mechanism are disengaged. In this way, the park lock unit is locked when the system loses power.

FIG. 5 shows a method 500 for operating a park lock unit in an electric drive system, such as park lock unit 200 shown in FIGS. 2-4D. However, the method 500 may be implemented by another suitable park lock unit and electric drive system, in other embodiments. It will be appreciated that the some of the steps in the method 500 are passively implemented in response to changes in vehicle operating conditions such as the loss of electrical power in the system while other steps are implemented in responsive to operator interaction with one or more input devices.

At 502, the method includes engaging the parking pawl with the toothed wheel via de-energization of the solenoid. This engagement is automatically carried out in the event of a power loss in the electric drive system and specifically a loss of electric power transfer to the solenoid. In this way, the park lock unit automatically locks in the event of a loss of electric power in the electric drive system.

Next at 504, the method includes disengaging the parking pawl from the toothed wheel via the manual release mechanism in response to the operator actuating the release mechanism. For instance, the operator may actuate a lever, knob, and the like that is attached to a cable. In turn, the cable pulls the lever in the manual release mechanism to place the park lock unit in an unlocked state when towing is desired, for instance.

At 506, the method includes re-engaging the parking pawl and the toothed wheel via operator induced reset of the manual release mechanism. In this way, the operator can re-engage the park lock unit when free rotation of the transmission is no longer desired (e.g., after towing operation has ended). Method 500 allows the park lock unit to be automatically locked when the vehicle loses power and then manually unlocked when vehicle movement is wanted, such as during towing operation. Consequently, the park lock unit's capabilities are expanded.

The technical effect of the park lock unit operating method described herein is to inhibit unintended vehicle movement when the vehicle loses power while also permitting the park lock to be disengaged during certain conditions to expand the system's functionality and applicability.

FIGS. 2-4D are drawn approximately to scale. However, other relative component dimensions may be used, in alternate embodiments.

FIGS. 1-4D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements parallel, perpendicular, or angled with regard to one another may be referred to as such.

The invention will be further described in the following paragraphs. In one aspect, a park lock unit is provided that includes a sliding assembly configured to engage and disengage a parking pawl from a toothed wheel; an electronic actuation assembly configured to engage the parking pawl with the toothed wheel when electric power provided to the electronic actuation assembly drops below a threshold value; and a manual release mechanism configured to disengage the parking pawl from the toothed wheel in response to operator input.

In another aspect, a method for operating a park lock unit is provided that includes while a solenoid in an electronic actuation assembly is de-energized and a parking pawl in a sliding assembly is engaged with a toothed wheel, disengaging the parking pawl from the toothed wheel via a manual release mechanism that induces translation of the sliding assembly in response to operator input. In one example, the method may further include prior to disengaging the parking pawl from the toothed wheel via the manual release mechanism, engaging the parking pawl with the toothed wheel via de-energization of the solenoid. In another example, the method may further include re-engaging the parking pawl with the toothed wheel via the manual release mechanism in response to operator input.

In yet another aspect, a park lock unit in an electric vehicle (EV) is provided that includes a sliding assembly configured to engage and disengage a parking pawl from a toothed wheel; an electronic actuation assembly including a solenoid configured to, in a de-energized configuration, release engagement between a retaining pawl and the sliding assembly, wherein the parking pawl engages the toothed wheel in response to releasing engagement between the retaining pawl and the sliding assembly; and a manual release mechanism including a cam that in response to operator input, axial pushes the sliding assembly to disengage the parking pawl from the toothed wheel.

In any of the aspects or combinations of the aspects, disengaging the parking pawl from the toothed wheel may include axially translating the sliding assembly via a cam in the manual release mechanism and wherein axially translating the sliding assembly places a ramp in the parking pawl and a roller in the sliding assembly in a retracted position.

In any of the aspects or combinations of the aspects, the operator input may include actuating a cable in the manual release mechanism.

In any of the aspects or combinations of the aspects, the threshold value may be zero or a value that is approaching the zero.

In any of the aspects or combinations of the aspects, the electronic actuation assembly may include a solenoid that retracts and decouples a retaining pawl from the sliding assembly when de-energized.

In any of the aspects or combinations of the aspects, the parking pawl may pivot about a pawl shaft and may include a spring that when compressed urges the parking pawl into an engaged configuration when the sliding assembly axially translates into its disengaged position.

In any of the aspects or combinations of the aspects, the sliding assembly may include a roller that interacts with a ramped surface on the parking pawl to urge the parking pawl into an engaged position during sliding assembly engagement.

In any of the aspects or combinations of the aspects, the manual release mechanism may include a cam that induces translation of the sliding assembly into a disengaged position, when actuated.

In any of the aspects or combinations of the aspects, the manual release mechanism may be actuated via a cable.

In any of the aspects or combinations of the aspects, the electronic actuation assembly may include a retaining pawl that includes a first end with an extension that selectively mates with a recess in the sliding assembly and rotates about a pivot positioned between the first end and a second end.

In any of the aspects or combinations of the aspects, the park lock unit may further comprise a housing enclosing at least a portion of the sliding assembly, the manual release mechanism, and the electronic actuation assembly.

In any of the aspects or combinations of the aspects, the housing may be profiled to mechanically attach to a transmission.

In any of the aspects or combinations of the aspects, the sliding assembly may include a roller that interacts with a ramped surface on the parking pawl.

In any of the aspects or combinations of the aspects, the park lock unit may further comprise a housing enclosing at least a portion of the sliding assembly, the manual release mechanism, and the electronic actuation assembly, wherein the housing is profiled to mechanically attach to a transmission.

In any of the aspects or combinations of the aspects, the retaining pawl may include a first end with an extension that selectively mates with a recess arranged at a first axial side of the sliding assembly, wherein the retaining pawl rotates about a pivot that is positioned between the first end and a second end and wherein the cam in the manual release mechanism is positioned adjacent to a second axial side of the sliding assembly.

In any of the aspects or combinations of the aspects, the solenoid may include a shaft that contacts a first end of the retaining pawl and a second end of the retaining pawl includes a protrusion that mates with a recess in the sliding assembly when the solenoid is energized and the shaft is extended.

In another representation, a park lock device in an electric vehicle (EV) transmission is provided that includes an electric actuation mechanism configured to engage the park lock device with a parking gear when electrical power delivered to the solenoid falls below a threshold value and a manual release mechanism configured to release the engagement of the park lock device in response to operation input.

Note that the example methods included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A park lock system, comprising:
   a sliding assembly configured to engage and disengage a parking pawl;
   an electronic actuation assembly configured to release the sliding assembly and engage the parking pawl in response to de-energization of the electronic actuation assembly; and
   a manual release mechanism configured to disengage the parking pawl in response to operator input;
   wherein the manual release mechanism includes a lever which actuates a cam that moves the sliding assembly into a disengaged position, when actuated; and
   wherein the electronic actuation assembly and the manual release mechanism function independent of one another.

2. The park lock system of claim 1, wherein the manual release mechanism includes a cable or a mechanical linkage that is coupled to the lever.

3. The park lock system of claim 2, wherein the manual release mechanism includes an operator interface that is coupled to the cable or the mechanical linkage.

4. The park lock system of claim 3, wherein the operator interface is a pedal.

5. The park lock system of claim 1, wherein the manual release mechanism includes a cam shaft that is coupled to the cam and the lever.

6. The park lock system of claim 1, wherein the electronic actuation assembly is de-energized in response to a power loss event in an electric drive.

7. The park lock system of claim 1, wherein the electronic actuation assembly includes a solenoid that when energized urges a retaining pawl into engagement with the sliding assembly.

8. The park lock system of claim 1, wherein the parking pawl pivots about a pawl shaft and wherein the pawl shaft is coupled to a transmission housing.

9. The park lock system of claim 1, wherein the sliding assembly includes a spring loaded carriage.

10. A method for operation of a park lock system, comprising:
    disengaging a parking pawl from via a manual release mechanism that induces translation of a sliding assembly in response to operator input;
    wherein the park lock system includes:
       the sliding assembly configured to engage and disengage the parking pawl;
       an electronic actuation assembly configured to release the sliding assembly and engage the parking pawl in response to de-energization of the electronic actuation assembly; and
       the manual release mechanism;
       wherein the manual release mechanism includes a lever which actuates a cam that moves the sliding assembly into a disengaged position, when actuated; and
       wherein the electronic actuation assembly and the manual release mechanism function independent of one another.

11. The method of claim 10, further comprising:
    prior to disengaging the parking pawl, engaging the parking pawl via de-energization of a solenoid in the electronic actuation assembly; and subsequent to disengaging the parking pawl, re-engaging the parking pawl via operation of the manual release mechanism.

12. The method of claim 11, wherein the solenoid is de-energized in response to a power loss in an electric drive.

13. The method of claim 10, wherein the operator input includes operator interaction with a pedal.

14. A park lock system for an electric drive, comprising:
a sliding assembly configured to engage and disengage a parking pawl;
an electronic actuation assembly configured to release the sliding assembly and engage the parking pawl in response to de-energization of the electric drive; and
a manual release mechanism configured to disengage the parking pawl in response to operator input;
wherein the manual release mechanism includes a lever which actuates a cam that moves the sliding assembly into a disengaged position, when actuated; and
wherein the electronic actuation assembly and the manual release mechanism function independent of one another.

15. The park lock system of claim 14, wherein the manual release mechanism includes:
a mechanical linkage that is coupled to the lever; and
an operator interface that is coupled to the mechanical linkage.

16. The park lock system of claim 14, wherein:
the parking pawl pivots about a pawl shaft and includes a return spring that is compressed when the parking pawl is engaged; and
the sliding assembly includes a roller that interacts with a ramped surface on the parking pawl to urge the parking pawl into an engaged position during sliding assembly engagement.

17. The park lock system of claim 14, wherein:
the electronic actuation assembly includes a solenoid that when energized urges a retaining pawl into engagement with the sliding assembly; and
the electronic actuation assembly is de-energized in response to a power loss event in the electric drive.

18. The park lock system of claim 17, wherein the sliding assembly includes a roller which interacts with the parking pawl during disengagement of the parking pawl.

19. The park lock system of claim 14, wherein the cam is directly coupled to a cam shaft.

20. The park lock system of claim 19, wherein the cam shaft is directly coupled to the lever.

* * * * *